3,410,912
1-(α-HYDROXY - β - TRICHLOROETHYL)-DICYCLO-PENTADIENE AND DI- AND TETRAHALO DERIVATIVES THEREOF
Herman A. Bruson, Woodbridge, and Howard L. Plant, Milford, Conn., assignors to Olin Mathieson Chemical Corporation, a corporation of Virginia
No Drawing. Filed Oct. 4, 1965, Ser. No. 492,882
5 Claims. (Cl. 260—617)

ABSTRACT OF THE DISCLOSURE

Derivatives of dicyclopentadiene are prepared by first reacting dicyclopentadiene with chloral in a solvent and in the presence of a Friedel-Craft catalyst to give 1-(α-hydroxy-β-trichloroethyl)-dicyclopentadiene which can then be reacted with chlorine and/or bromine to form halogenated derivatives. The compounds are useful in the preparation of polyurethane plastics and foams which are noncombustible and, in addition, they possess pesticidal and herbicidal properties.

This invention relates to new derivatives of dicyclopentadiene having the formula:

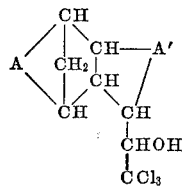

wherein A and A' are each a divalent radical selected from the group consisting of:

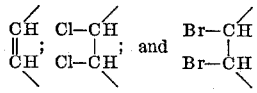

which complete the dicyclopentadiene ring system.

According to this invention, the above new compounds are obtained by reacting dicyclopentadiene with chloral in the presence of a Friedel-Crafts catalyst under anhydrous conditions; preferably in the presence of an inert diluent to moderate the exothermic reaction; and optionally thereafter adding halogen (chlorine or bromine) to the 1-(α-hydroxy-β-trichloroethyl)-dicyclopentadiene thus formed. As Friedel-Crafts catalysts, anhydrous aluminum trichloride, aluminum tribromide, titanium tetrachloride or ferric chloride can be used. Typical inert solvents for the reaction are petroleum ether, hexane or ethylene dichloride.

It is already known that chloral can be condensed with olefins to yield mixtures of trichloromethyl carbinol derivatives in which the Cl₃C—CHOH— group is predominantly on an unsaturated carbon atom (J. Colonge and A. Perrot, Bull. Soc. Chim. France, 1957, 204–08). In the case of cyclic olefins, chloral reacts for example, on the unsaturated carbon atom of cyclohexene to give cyclohexenyl trichloromethyl carbinol as shown below (E. D. Bergman and A. Becker, J. Org. Chem. 23, 1554 (1958)).

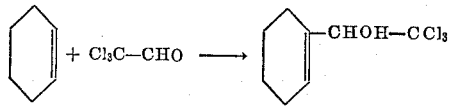

In contrast to this, according to the present invention, chloral reacts with dicyclopentadiene exclusively on the allylic carbon atom adjacent to the double bond as shown below to yield 1-(α-hydroxy - β - trichloroethyl)-dicyclopentadiene.

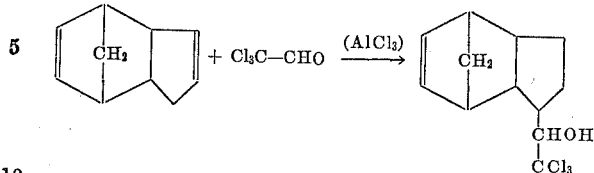

This structure for the product has been confirmed by nuclear magnetic resonance and infrared spectra analysis.

The 1 - (α-hydroxy-β-trichloroethyl)-dicyclopentadiene, thus obtained, readily adds chlorine or bromine to one or both of its double bonds. These di- or tetrahalogen addition products, for example:

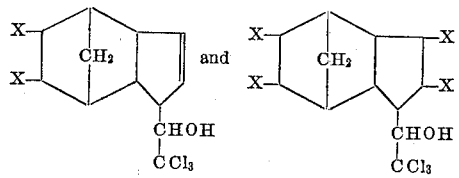

are resin-like materials possessing useful properties as fire retardants in plastics. Because of their free hydroxyl group they combine with isocyanates to give urethanes, and can thus find application in the manufacture of polyurethane plastics and foams which are non-combustible. They also possess pesticidal and herbicidal properties.

The following examples which illustrate the invention are to be considered not limitative.

EXAMPLE I

Three grams of aluminum chloride was added slowly and in small portions to a stirred, cooled solution of 100 g. of (0.75 mole) dicyclopentadiene (freshly vacuum-distilled) and 73 g. chloral (0.5 mole) in 100 ml. of n-hexane. The temperature was maintained at 5–10° C. during the addition period (20 minutes) by means of a bath of Dry Ice-acetone mixture, and at 0–2° C. for an additional two hours in an ice bath. The reaction mixture was then poured into 350 ml. of cold water, shaken vigorously, the organic layer washed thoroughly several times with water and then dried over sodium sulfate. Distillation in vacuum of the dried solution yielded 31 g. of recovered impure dicyclopentadiene and 76 g. of crude product coming over at 130–167° C./0.2 mm. Refractionation of this cut in vacuum yielded 59.6 g. of 1-(α-hydroxy-β-trichloroethyl)-dicyclopentadiene boiling at 129–131° C./0.1 mm.; $n_D^{25}$ 1.5495, as a colorless viscous liquid which turned pale yellow on standing in air.

Analysis.—Calc'd for $C_{12}H_{13}Cl_3O$: C, 51.50%; H, 4.69%; Cl, 38.09%. Found: C, 51.32%; H, 4.63%; Cl, 38.20.

It was confirmed by nuclear magnetic resonance and infrared spectrum analysis that the structure of the product was:

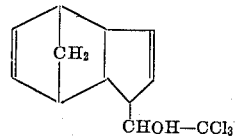

EXAMPLE II

A solution of 219 g. (1.5 moles) chloral and 100 g. (1.5 moles) dicyclopentadiene in 100 ml. of n-hexane was added slowly with stirring and cooling to a slurry of 6 g. anhydrous aluminum chloride in 100 ml. of n-hexane during the course of one hour. The exothermic reaction was maintained at −5 to +5° C. by means of intermittent cooling with a dry ice bath. The reaction mixture was stirred for an additional two hours at 2–3° C. and then shaken vigorously with 350 ml. of cold water. The separated organic layer was washed with three 150 ml. portions of water, dried over sodium sulfate and distilled in vacuum. The fraction boiling at 125–175° C./0.1 mm. (166 g.) was fractionally redistilled in vacuum to yield 134 g. of 1-(α-hydroxy-β-trichloroethyl)-dicyclopentadiene boiling at 129–131° C./0.1 mm.

EXAMPLE III (a) Chlorine was bubbled into a cold (0°–10°C.) solution of 84 g. (0.3 mole) of 1-(α-hydroxy-β-trichloroethyl)-dicyclopentadiene in 200 ml. of carbon tetrachloride in the absence of light, until the gain in weight was 42.6 g. (0.6 mole chlorine). Evaporation of the solvent and low boilers in vacuum at 60–75° C./1420 mm. gave a quantitative yield of the tetrachloro derivative having the formula:

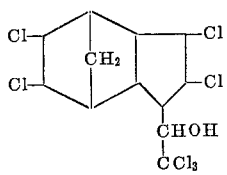

This product which was initially a viscous syrup hardened on cooling to a rosin-like transparent mass.

*Analysis.*—Calc'd for $C_{12}H_{13}Cl_7O$: C, 34.13%; H, 3.10%; Cl, 58.94%. Found: C, 34.36%; H, 3.09%; Cl, 58.80%.

(b) Two (2) mole equivalents of bromine as a 10 percent solution of bromine in carbon tetrachloride were added dropwise at 0–5°C. to a stirred 20 percent solution of one mole equivalent of 1-(α-hydroxy-β-trichloroethyl)-dicyclopentadiene in carbon tetrachloride kept in the dark. After evaporation of volatile materials as in (a) above, the tetrabromo product having the formula:

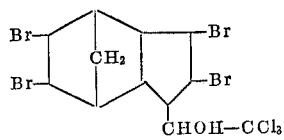

was obtained as an amber-colored, rosin-like material.

(c) One (1) mole equivalent of chlorine as a 10 percent solution of chlorine in carbon tetrachloride was added at 0–5°C. to a stirred 20 per cent solution of one (1) mole equivalent of 1-(α-hydroxy-β-trichloroethyl)-dicyclopentadiene in carbon tetrachloride kept in the dark. After evaporation of volatile materials as in (a) above, the dichloro-adduct of 1-(α-hydroxy-β-trichloroethyl)-dicyclopentadiene was obtained as a thick oil.

(d) The dichloro-aduct obtained in (c) above was reacted with one (1) mole equivalent of bromine in carbon tetrachloride solution to give a resinous product which was a mixture of the dichloro- and dibromo adducts of 1-(αhydroxy-β-trichloroethyl)-dicyclopentadine.

Reaction of chloral with dicyclopentadiene

The temperature of this reaction can be varied from about −30° to about 50°C. depending upon the particular solvent employed and upon the other reaction conditions selected. However, the preferred reaction range is from about −10° to about +20°C. The molar proportions of chloral reacted with dicyclopentadiene can be varied over a wide range and generally will be from about 0.5 to about 1.5 moles of chloral per mole of dicyclopentadiene utilized.

The quantity of the Friedel-Crafts catalyst employed can likewise be varied widely from about 0.01 to about 1 mole of the catalyst per mole of dicyclopentadiene utilized. The preferred range of catalyst concentration, however, is from about 0.01 to about 0.1 mole of the catalyst per mole of dicyclopentadiene.

Reaction of 1-(α-hydroxy-β-trichloroethyl)-dicyclopentadiene with a halogen

The halogenation reaction is preferably carried out in the presence of an inert organic solvent. Useful inert organic solvents include, for example, chlorinated hydrocarbons such as carbon tetrachloride, ethylene dichloride; lower dialkyl ethers such as diethyl ether; saturated aliphatic hydrocarbons such as low boiling petroleum ether, ligroin, or hexane.

In the preferred embodiment of the halogenation reaction, a solution of the 1-(α-hydroxy-β-trichloroethyl)-dicyclopentadiene is contacted with gaseous chlorine or bromine or with a solution of the halogen in a suitable solvent. The halogenation reaction can also be conducted employing liquid chlorine or bromine. Generally, the temperature of this reaction will be from about −10 to about +50°C. and preferably will be from about −5 to about +20°C.

What is claimed is:
1. A compound having the formula:

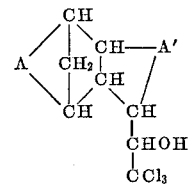

wherein A and A' are each a divalent radical selected from the group consisting of:

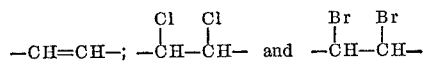

with the proviso that one of A and A' is selected from the group consisting of:

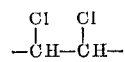

and

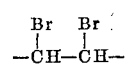

2. The compound having the formula:

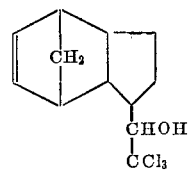

3. The compound having the formula:

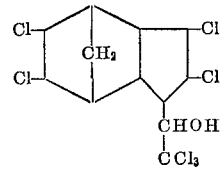

4. The compound having the formula:

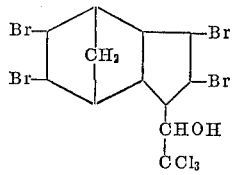

5. A method for the preparation of the compound:

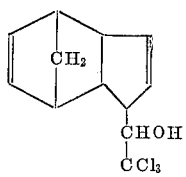

which comprises reacting under anhydrous conditions at a temperature of about −30°C. to about 50°C. dicyclopentadiene with chloral in the presence of a Friedel-Crafts catalyst, there being from about 0.5 to about 1.5 moles of chloral reacted per mole of dicyclopentadiene.

References Cited

UNITED STATES PATENTS

| | | | |
|---|---|---|---|
| 2,814,639 | 11/1957 | Bartlett et al. | 260—617 |
| 3,118,913 | 1/1964 | Carlson | 260—617 |
| 3,238,251 | 3/1966 | Williams | 260—617 |
| 3,268,597 | 8/1966 | Clemons et al. | 260—632 |

FOREIGN PATENTS 1,350,242  12/1963  France.

OTHER REFERENCES

Broquet: "Ann. Chim. (Paris)," vol. 3, pp. 204–12 (1958).

Vilkas et al.: "Bull. Chim. Soc. Fr.," 1955, pp. 799–805.

LEON ZITVER, *Primary Examiner.*

T. G. DILLAHUNTY, *Assistant Examiner.*

UNITED STATES PATENT OFFICE
CERTIFICATE OF CORRECTION

Patent No. 3,410,912                                              November 12, 1968

Herman A. Bruson et al.

It is certified that error appears in the above identified patent and that said Letters Patent are hereby corrected as shown below:

Column 2, lines 3 to 10 and column 4, lines 58 to 65, the right-hand portion of the formula, each occurrence, should appear as shown below:

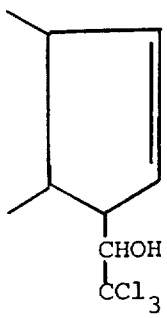

Column 3, line 18, "1420" should read -- 14-20 --.

Signed and sealed this 24th day of March 1970.

(SEAL)
Attest:

EDWARD M. FLETCHER, JR.
Attesting Officer

WILLIAM E. SCHUYLER, JR.
                                                       Commissioner of Patents